US009027371B2

(12) United States Patent
Beihoff et al.

(10) Patent No.: US 9,027,371 B2
(45) Date of Patent: May 12, 2015

(54) HEAT PUMP (SERVER) COUPLED WASHER AND DRYER PAIR

(75) Inventors: Bruce C. Beihoff, Stevensville, MI (US); Nihat O. Cur, Saint Joseph, MI (US); Kirk M. Dunsbergen, Stevensville, MI (US); Joel A. Luckman, Benton Harbor, MI (US); Richard A. Sunshine, Granger, IN (US); Tao Xie, Copley, OH (US)

(73) Assignee: Whirlpool Corporation, Benton Harbor, MI (US)

( * ) Notice: Subject to any disclaimer, the term of this patent is extended or adjusted under 35 U.S.C. 154(b) by 943 days.

(21) Appl. No.: 13/169,290

(22) Filed: Jun. 27, 2011

(65) Prior Publication Data

US 2011/0252835 A1 Oct. 20, 2011

Related U.S. Application Data

(63) Continuation-in-part of application No. 12/858,799, filed on Aug. 18, 2010.

(60) Provisional application No. 61/234,674, filed on Aug. 18, 2009.

(51) Int. Cl.
*D06F 39/00* (2006.01)
*D06F 39/04* (2006.01)
(Continued)

(52) U.S. Cl.
CPC ........... *D06F 39/006* (2013.01); *A47L 15/0097* (2013.01); *D06F 29/005* (2013.01); *D06F 33/02* (2013.01); *D06F 39/005* (2013.01); *D06F 39/04* (2013.01); *D06F 58/206* (2013.01); *D06F 58/28* (2013.01); *D06F 2058/2854* (2013.01); *D06F 2058/2896* (2013.01); *F28D 20/02* (2013.01);
(Continued)

(58) Field of Classification Search
CPC ..... D06F 39/006; D06F 39/04; D06F 29/005; D06F 58/04
USPC .............................................................. 68/27
See application file for complete search history.

(56) References Cited

U.S. PATENT DOCUMENTS 3,771,238 A * 11/1973 Vaughn ............................ 34/86
4,275,510 A * 6/1981 George ............................ 34/90
(Continued)

FOREIGN PATENT DOCUMENTS

DE 2161495 A1 6/1973
DE 10045074 3/2002
(Continued)

OTHER PUBLICATIONS

European Search Report for Corresponding EP 12172760.6, Nov. 5, 2012.

*Primary Examiner* — Joseph L Perrin

(57) ABSTRACT

An appliance system that includes an appliance group containing at least two appliances, a first appliance designed to perform a first consumer function related to the first appliance and a second appliance that is separate from the first appliance and designed to perform a second consumer function related to the second appliance. The appliance system also includes a thermal energy generator, typically a heat pump, where the thermal energy heats at least one thermal energy bearing fluid and is operably connected to the first and second appliances to deliver thermal energy to the first and second appliances simultaneously or at different times via one or more of the thermal energy bearing fluids.

12 Claims, 8 Drawing Sheets

(51) Int. Cl.

| | |
|---|---|
| ***D06F 33/02*** | (2006.01) |
| ***D06F 29/00*** | (2006.01) |
| ***D06F 58/20*** | (2006.01) |
| ***D06F 58/28*** | (2006.01) |
| ***F28D 20/02*** | (2006.01) |
| ***F25B 30/06*** | (2006.01) |
| *A47L 15/00* | (2006.01) |
| *F28D 20/00* | (2006.01) |

(52) U.S. Cl.
CPC ......... *F28D 2020/006* (2013.01); *Y02E 60/145* (2013.01); *F25B 30/06* (2013.01)

(56) References Cited

U.S. PATENT DOCUMENTS

| | | | | |
|---|---|---|---|---|
| 4,509,345 | A * | 4/1985 | Alio | 68/20 |
| 4,891,892 | A * | 1/1990 | Narang | 34/86 |
| 5,228,318 | A * | 7/1993 | Burgin | 68/207 |
| 5,537,955 | A | 7/1996 | Wu | |
| 5,787,537 | A | 8/1998 | Mannillo | |
| 7,055,262 | B2 | 6/2006 | Goldberg et al. | |
| 7,275,504 | B2 | 10/2007 | Schaeche et al. | |
| 7,404,303 | B1 | 7/2008 | Barbosa et al. | |
| 7,665,225 | B2 | 2/2010 | Goldberg et al. | |
| 2006/0174915 | A1 | 8/2006 | Hedstrom et al. | |
| 2007/0227467 | A1 | 10/2007 | Gordon et al. | |
| 2007/0251115 | A1* | 11/2007 | Bringewatt et al. | 34/134 |
| 2008/0245087 | A1* | 10/2008 | Orcutt | 62/238.7 |
| 2009/0000573 | A1 | 1/2009 | McClellan | |
| 2010/0024239 | A1 | 2/2010 | Kono et al. | |
| 2010/0107703 | A1 | 5/2010 | Hisano et al. | |
| 2011/0011136 | A1* | 1/2011 | Wientjens | 68/15 |
| 2011/0041564 | A1 | 2/2011 | Beihoff et al. | |

FOREIGN PATENT DOCUMENTS

| | | | |
|---|---|---|---|
| EP | 1548174 | A1 | 6/2005 |
| WO | 2011/022479 | A2 | 2/2011 |

* cited by examiner

HEAT PUMP (SERVER) COUPLED WASHER AND DRYER PAIR

CROSS REFERENCE TO THE RELATED APPLICATION

This application is a Continuation-in-part of application Ser. No. 12/858,799 filed on Aug. 18, 2010. Application Ser. No. 12/858,799 claims the benefit of U.S. Provisional Application 61/234,674 filed on Aug. 18, 2009. the entire disclosures which are hereby incorporated by reference.

SUMMARY OF THE INVENTION

An embodiment of the present invention is generally directed toward an appliance system that includes an appliance group where the appliance group has at least two appliances including: a first appliance designed to perform a first consumer function related to the first appliance; a second appliance that is separate from the first appliance where the second appliance is designed to perform a second consumer function related to the second appliance; and a thermal energy generator. A thermal energy generator, according to an embodiment of the present invention heats at least one thermal energy bearing fluid, typically a liquid or gas, and the thermal energy generator is operably connected to the first appliance and the second appliance. The thermal energy generator typically delivers thermal energy to the first and second appliance simultaneously or at different times via one or more of the thermal energy bearing fluids.

Another embodiment of the present invention is generally directed toward an appliance system that includes a washer and dryer group where the washer and dryer each use a separate and independent chamber for processing fabric materials and a heat pump. The heat pump supplies thermal energy to both the washer and dryer.

Yet another embodiment of the present invention is generally directed toward a method of delivering and distributing thermal energy between at least two appliances using a thermal energy generator operably connected to the at least two appliances and one or a plurality of thermal energy bearing fluids. The thermal energy bearing fluids typically transfer thermal energy between the thermal energy generator and the first and second appliances.

The thermal energy generator may be a water heater. The water heater includes a first inlet, second inlet, and an outlet, the first inlet in fluid communication with a utility water supply, the outlet and second inlet in fluid communication with the appliance group. Thermal bearing fluids, in particular "grey water" may be delivered from the appliance group to the water heater via the second inlet so as to replenish the water heater with thermal bearing fluids.

The appliance system may include a database storing a plurality of cycle of parameters. The cycle of parameters include the steps a respective appliance must take to accomplish selected task. The cycle of parameters may further include the energy load required to complete the selected task. In addition, sensors may be provided to detect the thermal energy generated by each appliance. The sensors may be in communication with a processor that is operable to process the thermal energy generated by the appliances along with projected thermal energy needs of a selected cycle of parameters in order to distribute or share thermal energy bearing fluids between appliances in the appliance group and thereby reduce energy consumption.

Another embodiment generally includes a method of delivering, recovering, storing, and redistributing thermal energy between separate appliances of an appliance group. The method typically includes the steps of providing an appliance group that includes at least two appliances. A first appliance is designed to perform a first consumer function related to the first appliance and a second appliance that is separate from the first appliance and is designed to perform a second consumer function related to the second appliance. The appliance group further includes a heat pump or other thermal energy generator. A thermal storage unit is also typically provided, and when provided, is operably connected to the heat pump (or other thermal energy generator), the first appliance, and the second appliance via one or more conduits to allow water or air (or other thermal energy bearing fluid) to be transferred to and from the heat pump and to and from the first home appliance, the second home appliance, or both. Thermal energy is delivered to a first amount of water or air (or other thermal energy bearing fluid) using the heat pump (or other thermal energy generator) and the heated water or air conveyed to at least one of the first home appliance and the second home appliance. Remaining thermal energy from the heated water or air is typically recovered using a thermal storage unit, when employed. When a thermal storage unit is employed, the recovered thermal energy is stored in the thermal storage unit and redistributed to a second amount of water or air (or other thermal energy bearing fluid) and conveyed to the heat pump (or other thermal energy generator), if further thermal energy is needed, or if not, directly to at least one of the first or second appliances without additional thermal energy being supplied by the heat pump (or other thermal energy generator).

Yet another embodiment includes a method of reducing energy consumption of an appliance system having a plurality of appliances by recycling thermal energy. The method includes the step of providing a water heater operable to supply thermal energy bearing fluids to the appliances. The water heater includes a first inlet, a second inlet and an outlet. The first inlet is coupled to a utility water source, so as to be in fluid communication with a utility water source. The heated water is then delivered to various appliances upon user demand through the outlet.

The second inlet is also in fluid communication with the appliances. The appliances draw hot water from the water heater through the outlet. It should be appreciated that the water heater replenishes the drawn hot water with relatively cold water from the utility water source. Thus, the water heater must consume additional energy to heat the cold water to the selected water temperature.

The method proceeds to the step of delivering thermal energy bearing fluids (hot water) from at least one of the appliances to the water heater via the second inlet so as to help replenish water in the water heater. The water heater may recover any deficiency in water capacity by drawing water from the utility water source.

DETAILED DESCRIPTION OF THE PREFERRED EMBODIMENT

Figure 1:
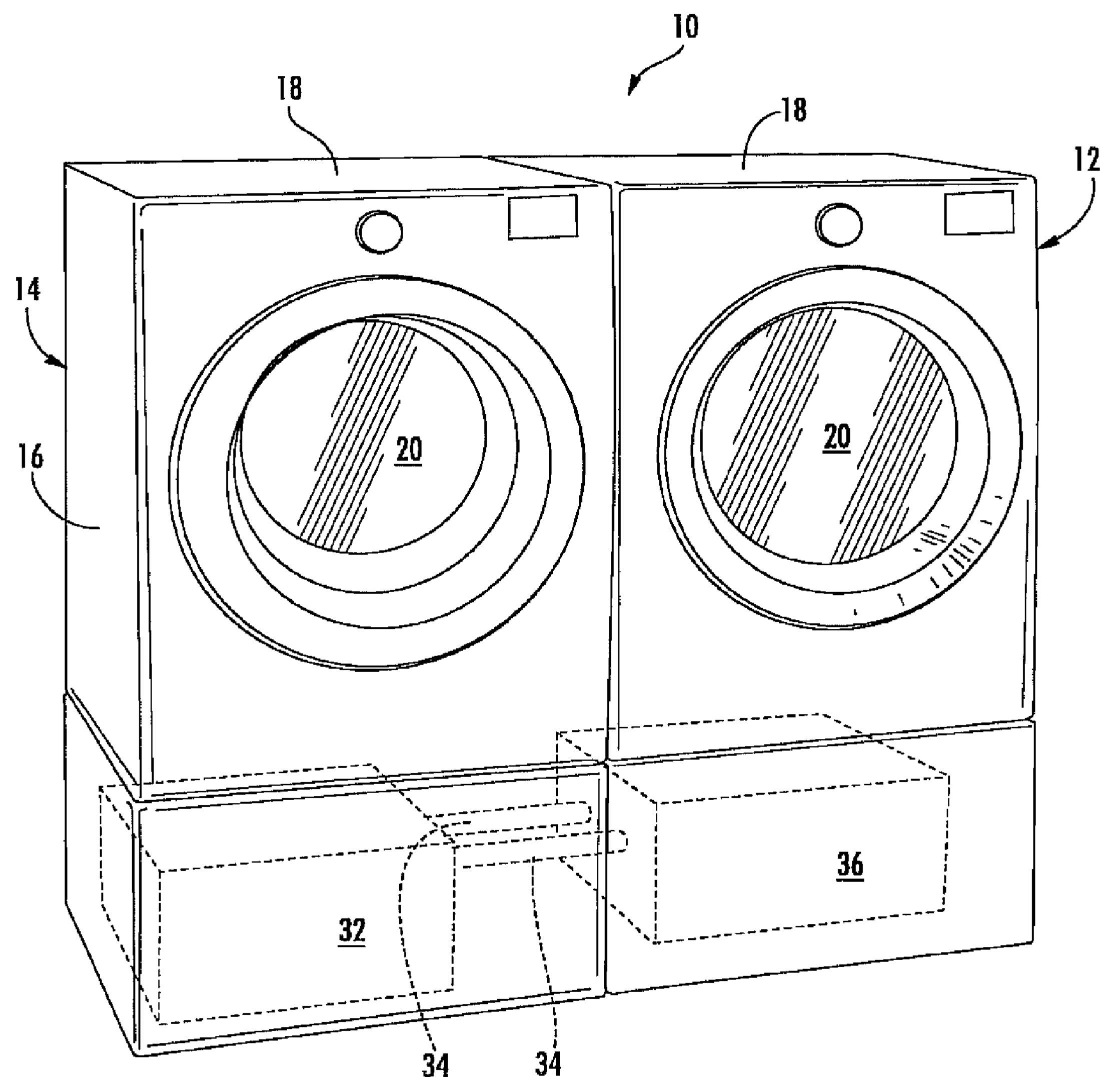
FIG. 1 is a perspective view of an appliance system according to an embodiment of the present invention.

For purposes of description herein, the terms "upper," "lower," "right," "left," "rear," "front," "vertical," "horizontal" and derivatives thereof shall relate to the appliance as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

According to an embodiment of the present invention, an appliance system, typically an appliance system 10 (see FIGS. 1-3) generally includes at least two appliances, a first appliance 12 designed to perform a first consumer function related to the first appliance and a second appliance 14, that is separate from the first appliance, where the second appliance is designed to perform a second consumer function related to the second appliance. The appliance group may include more than two separate appliances for example a third, a fourth and thereafter appliances. The appliances of the appliance group or subset of the appliances of the group are typically related appliances in function and proximity within a building, especially a residential housing. For example, the first appliance and second appliance may be a water heater and furnace or, for example, a washer and dryer pair. More broadly speaking, the appliance group may be a first laundry appliance and a second laundry appliance where the first laundry appliance is typically a washing machine and the second laundry appliance is typically a dryer. Other appliances that might be appliances of the appliance systems of the present invention include, but are not limited to, dishwashers, ovens (typically convection ovens), refrigerators, freezers, refrigerator and freezer appliances, and small appliances requiring thermal energy, for example, countertop appliances including coffee makers.

The consumer function of the appliances, when the appliances are laundry appliances, can be selected from the following group: washing, drying, refreshing, sanitizing, stain removal, ironing, hand steaming, sink, and combinations thereof. When the first appliance is a furnace, for example, the consumer function is typically heating of a building, typically a residence. Similarly, the consumer function for a water heater, when a water heater is a part of the appliance group, is heating water.

According to one embodiment of the present invention, the appliance group includes two laundry appliances. The laundry appliances are for washing and drying fabric items, such as clothes and linens. Examples of the laundry appliances include, but are not limited to, a washing machine, including top-loading, front-loading, vertical axis, and horizontal axis washing machines, a dryer, such as a tumble dryer, including top-loading dryers and front-loading dryers, a tumbling refreshing machine, an extractor, a non-aqueous washing apparatus, and cabinet based versions for non-tumble drying and refreshing. In addition, the two appliances can be two appliances of the same type, such as two washing machines, two hot water heaters, or two drying machines.

Figure 2:
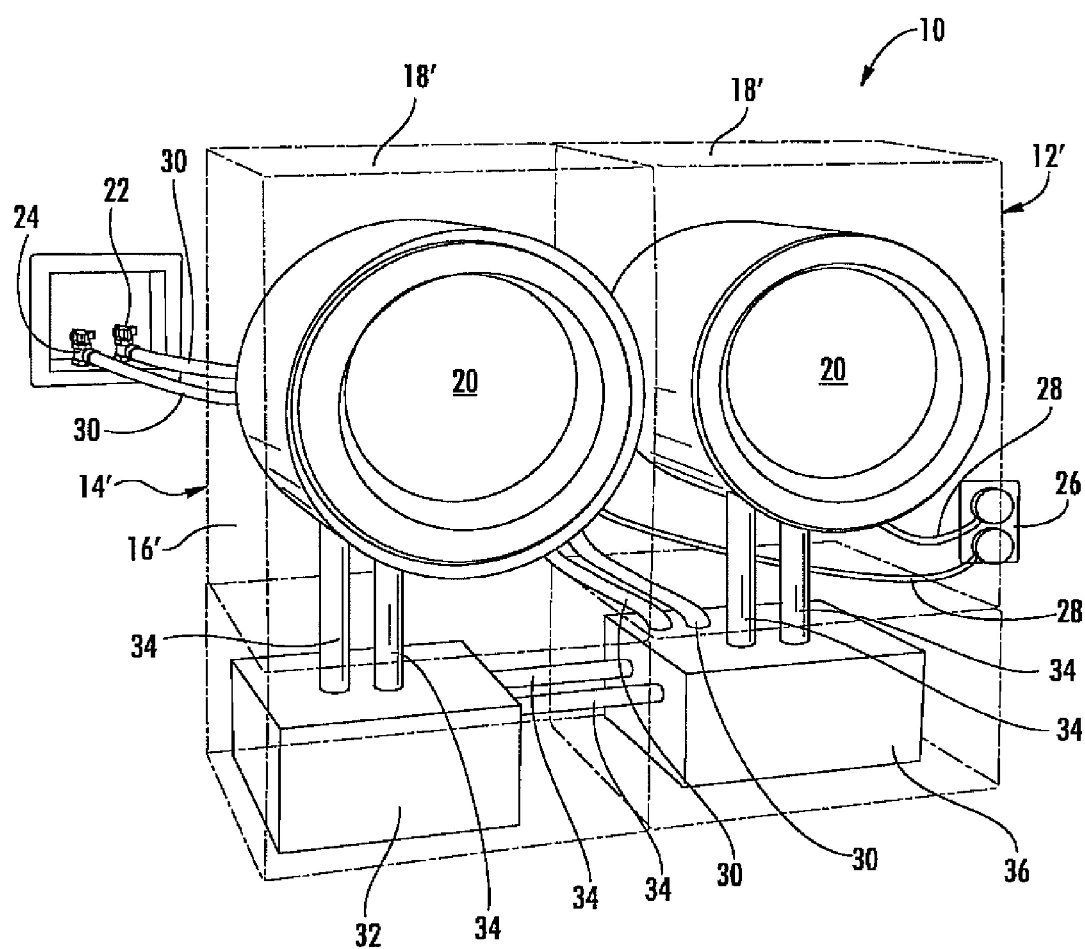
FIG. 2 is an interior perspective view of an appliance system according to an embodiment of the present invention.

When two or more laundry appliances are utilized according to an embodiment of the present invention, the laundry appliances each include a housing that typically includes left side walls 16 and right side walls, front and rear walls, and top walls 18 and bottom walls that together define the housing. A front loading washer and dryer pair are generally shown in FIGS. 1 and 2. The appliances typically employ clear doors 20 mounted to the front surface of the housing and typically hingedly connected thereto. The clear doors allow the user to view the fabric articles within the chamber before, during, and after processing by the appliance. In this manner, the operator can open the door and access fabric and clothing items contained within a chamber for receiving such articles for processing.

As shown generally in FIG. 2, the washer appliance 12 is typically connected to a hot water source 22 and cold water source from the main plumbing of a building, typically a residential dwelling or commercial establishment, requiring the use of a washer. Typically, the washing machine 12 is operably connected to an electrical outlet 26 for receiving electrical power. The dryer appliance 14 is also typically connected to an electrical outlet 26, which is the same or different outlet as the washer is connected to. Optionally, the dryer may also be connected to a water source similar to the washer if direct water resources are necessary to achieve the consumer function or functions of the dryer. For example, the dryer may be directly connected to a household plumbing source (hot and cold water, or hot or cold water) or may be connected via appropriate conduit to the same household water source as the washer. Water conduits 30, such as flexible hoses, are typically employed for this purpose.

According to one embodiment of the present invention, the appliance group utilizes a thermal energy generator 32 that generates heat, to heat at least one thermal energy bearing fluid. The thermal energy generator is typically operably connected to at least two of the appliances in the appliance group, more typically all of the appliances in the appliance group via appropriate conduits 34 to allow for the delivery of thermal energy to at least two of the appliances of the appliance group at the same or different times via one or more of the thermal energy bearing fluids. Preferably, the thermal energy generator is operably connected to each of the appliances of an appliance group. The thermal energy provided to the appliances by the thermal generator via the thermal energy bearing fluids is utilized to perform the consumer functions related to each individual appliance. The thermal energy generator produces heating effects for both the washer and dryer, in an example where the appliance group is a washer and dryer. The thermal energy generator that is typically a heat pump, could be any heating source for use in connection with an appliance, including an electrical resistance heater or combination of thermal energy generators.

According to an embodiment of the present invention, a thermal storage unit 36 may be operably connected to any embodiment of or combination of the present invention. In some instances, a thermal storage unit may be operably connected to the appliance group or subset of appliances within the group as well as the thermal energy generator. In particular, the thermal storage unit may be operably connected to the thermal energy generator and the first appliance and the second appliance via one or more conduits to allow one or more energy bearing fluids to be transferred to and from the thermal energy generator and to and from the first appliance and second appliance. In this manner, the thermal storage unit stores thermal energy for later use by one or more utilities and can be delivered to the first appliance and the second appliance when needed.

Figure 3:
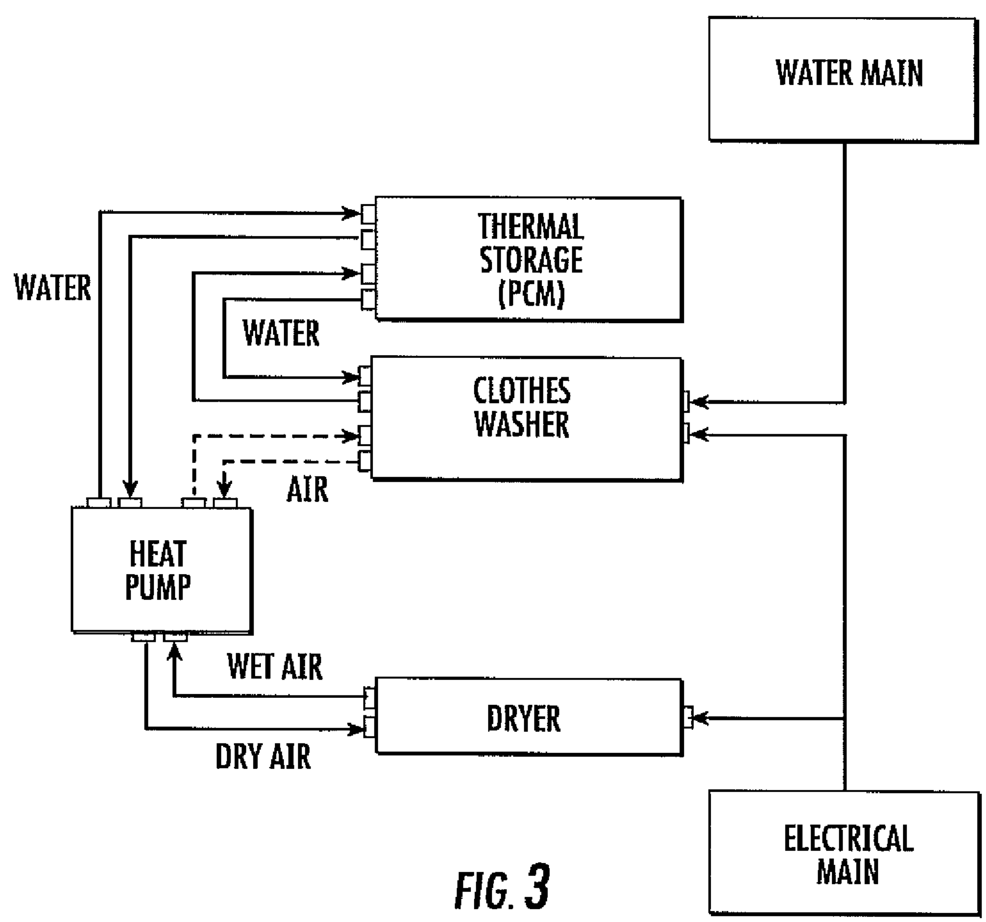
FIG. 3 is a schematic flow diagram of utility flow through an embodiment of an appliance system according to an embodiment of the present invention.

The thermal energy bearing fluid may be any gas or liquid. Additionally, as discussed above, the thermal energy generator may be a high efficiency heat pump or another heating source such as an electrical resistor heating subsystem. When employed, the heat pump is typically capable of receiving air, typically wet exhausted air from the dryer as well as air or water directly from a clothes washer and/or a thermal storage unit as generally shown in FIG. 3. As such, the heat pump system provides a combined heating solution for both the washing machine and the drying machine of a washer and dryer appliance group. In addition, the heat pump module improves washer and dryer efficiency by better sharing the thermal energy/heat between the two appliances.

Figure 4:
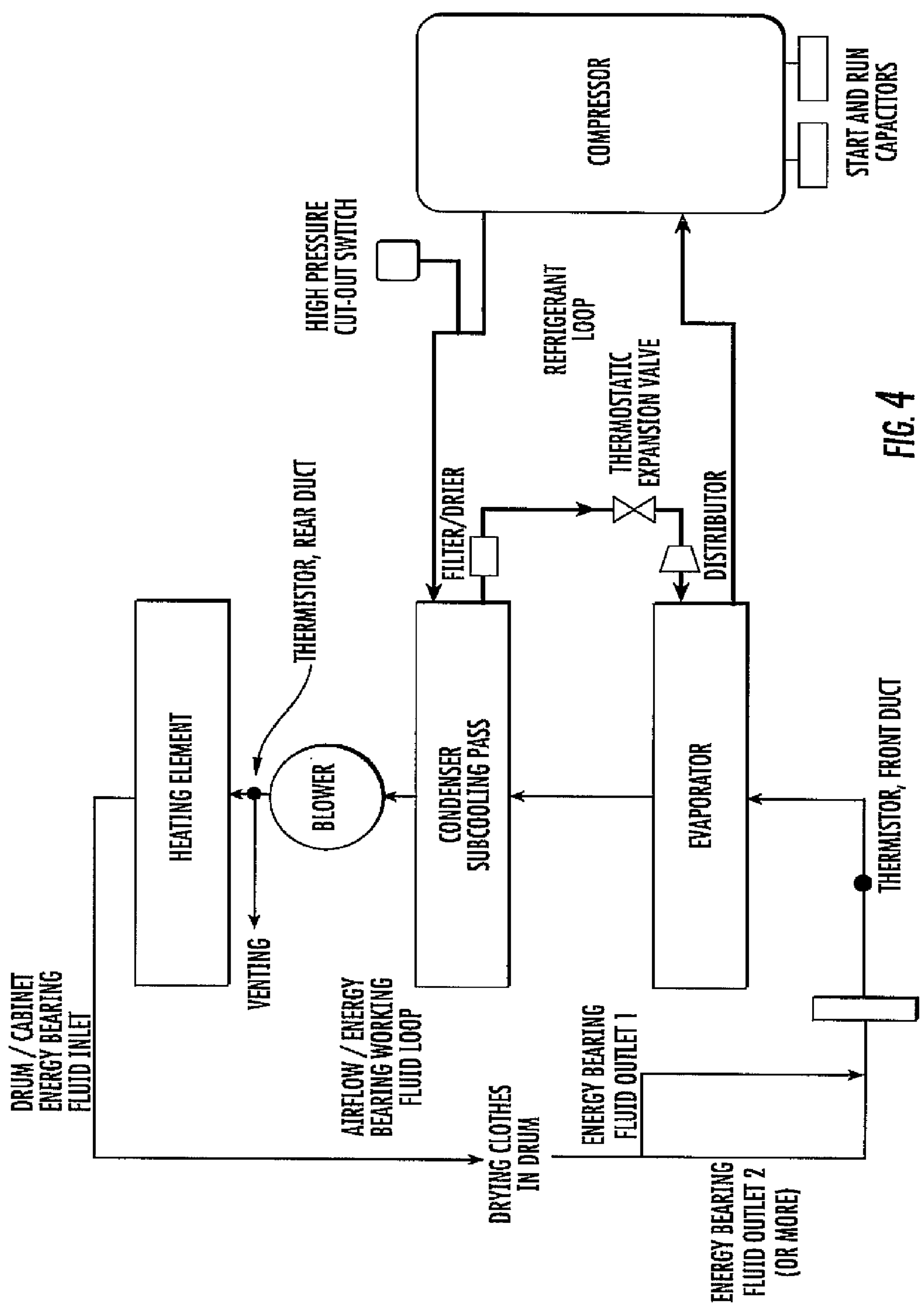
FIG. 4 is a schematic of a dryer and thermal energy generator closed loop system according to an embodiment of the present invention.

Moist air with a higher temperature than ambient with sensible and latent heat content coming from the outlet of the dryer is, according to one embodiment of the present invention, not vented to the outside of a building, typically a residential dwelling, but re-circulated through heat exchangers, an evaporator, and a condenser of the heat pump (See FIG. 4). The evaporator of the heat pump system recovers sensible and latent heat from the moist air by condensing the water vapor, thereby capturing what was previously waste heat exhausted out of conventional dryers. The recovered energy, according to one embodiment, is then used to heat drying air in the condenser subsystem of the heat pump. FIG. 4 shows a schematic of a high efficiency heat pump electric dryer linked system. The energy efficient closed loop flow operation of the dryer is enabled by re-circulating air. The re-circulated air is first dehumidified and then heated. The heat exchanger(s), typically two heat exchangers, in the heat pump system work in serial in the air flow path. The evaporator absorbs the heat and condenses the moisture out of the re-circulated air and the condenser supplies heat to the dry air. The process goes from an initial wrap-up phase to a constant rate phase, then to a falling rate phase varying with time. With the exception of a small heat loss during the constant rate, most if not all the sensible heat lost by the air is converted into latent heat of the water vapor in the drying air.

The electrical resistance heater may at maximum produce the amount of heat equivalent to the electrical power being provided thereto. Because the heat pump system has a coefficient of performance much higher than one, for example three, the electrical energy input to the compressor results in three units of heat input to the washing water or the drying air. The heat pump system, therefore potentially uses only one-third the energy input of a comparable electrical resistance heater used for heating the water and heating the dryer air. The closed loop air circulation in the dryer prevents the dryer from taking conditioned air from the building (typically a residential home), as opposed to conditioned air being exhausted out in the conventional air-vented dryer. As such, the new system reduces the cooling load on the air conditioning system of the overall building or the heating load on the heating system in the winter.

The coupled appliance group and heat pump, typically the clothes dryer, clothes washer, and heat pump provides other benefits such as low temperature drying of clothes which promotes good fabric care (minimum fabric shrinkage, less wrinkle formation, and reduction of fiber aging).

If a user runs two consecutive loads at the same time in a washer and dryer pair, meaning one load in a washer and another one in the dryer, the condenser, according to an embodiment of the present invention, accurately distributes heating loads between the washer and the dryer based upon the washer and dryer's different heating requirements. This is similarly true of the appliances other than a clothes washer and a clothes dryer.

The thermal storage unit 36 typically captures thermal energy using a phase change materials' (PCM) latent heat storage and can be achieved through solid-solid, solid-liquid, liquid-gas, and solid-gas phase change. However, according to the present invention, the phase change material typically used is a solid-liquid phase change material. The solid-liquid phase change material typically behaves like sensible heat storage materials initially, i.e. the temperature rises as the PCM absorbs thermal energy (heat). However, unlike conventional heat storage materials, when phase change materials reach the temperature at which they change phase, they absorb large amounts of heat at an almost constant temperature. As such, the phase change material absorbs heat without a significant raise in temperature until all the material is transformed to the liquid phase (in a solid-liquid phase change material). As the ambient temperature around the liquid phase change material falls, the phase change material solidifies, releasing its stored latent heat. The phase change materials of the present invention may include organic phase change materials, inorganic phase change materials and/or eutectic materials (organic-organic, organic-inorganic, inorganic-inorganic compounds). For example, phase change materials may include fatty acids and salt hydrates and when used in the present invention are typically non-toxic, non-corrosive, and not hygroscopic.

When a washer and dryer pair are two of the appliances of an appliance group according to the present invention, the interlinkage of the washer and dryer provides another unique benefit. The fins of the heat exchanger(s) can capture the lint thereby fouling the heat exchanger surface. When the washer and dryer are coupled, the rinse water coming from the washer side can serve as a lint cleaning method for the heat exchanger(s). The condensate can wash out some lint from the condenser surface and the at least substantially clean rinse water from the washer can flush away the lint left on the heat exchanger(s) surface(s).

The thermal energy generator, typically the heat pump, may be positioned within the pedestal or housing within a pedestal outside the appliance or within the housing of one of the appliances of the appliance group. Similarly, the thermal storage unit may be positioned external to the appliance group, within a pedestal below one or more of the appliances from the appliance group, or within the main housing of one of the appliances of the appliance group. As shown in FIG. 2, the heat pump 32 is shown in the pedestal below the dryer and the thermal storage unit 36 is shown below the washer in FIG. 2.

Figure 5:
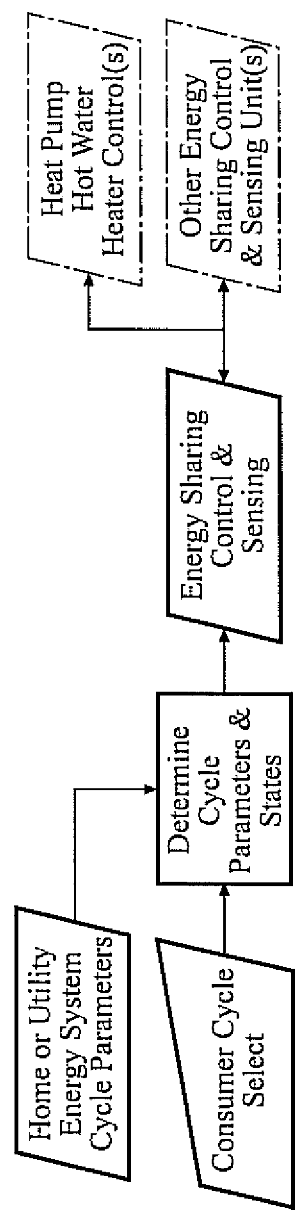
FIG. 5 is a process diagram of an appliance system according to a first preferred embodiment of the present invention.
Figure 6:
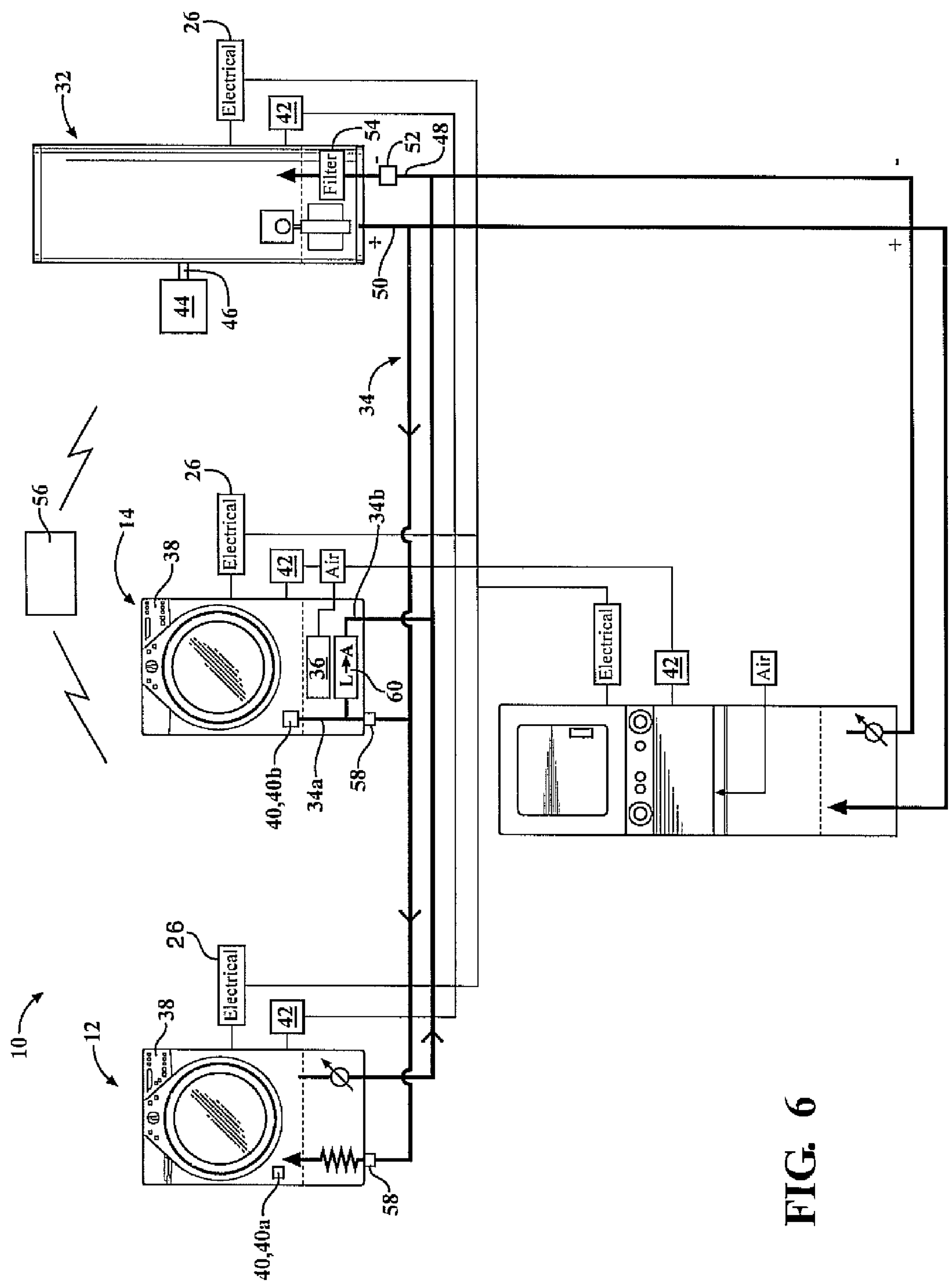
FIG. 6 is a perspective view of an appliance system according to a first preferred embodiment of the present invention.

With reference now to FIGS. 5 and 6 an appliance system 10 operable to recover and redistribute thermal energy between separate appliances 12, 14 of an appliance group is provided. The appliance system includes a plurality of cycle parameters for respective appliances in the appliance group. The cycle of parameters is indicative of the operating conditions for the respective washer and dryer appliances. The cycle of parameters includes the steps the appliance will take to complete a selected task. For instance, the washer may have a cycle parameter for a light wash, medium wash, or heavy wash indicating a washing condition for various loads of laundry. An illustrative example of tasks for a light wash is to fill the washer with a predetermined amount of water at a selected temperature, actuate the washer chamber in a pre-defined sequence of rotations using a predetermined amount of force over a predetermined time period, drain the washer, spin the chamber, and the like.

The appliances 12, 14 include an input 38 operable to actuate one of the cycles. The user actuates the input 38 so as to select a desired cycle of parameters, actuating the respective appliance in the selected cycle parameter. The appliance system is configured to sense the thermal energy of each of the operating appliances, and determine if thermal energy from one appliance may be transferred or shared with another appliance so as to reduce energy loads for operating the appliances. In instances where thermal energy bearing fluids may be transferred from one appliance to another so as to reduce energy consumption, a pump is actuated so as to deliver thermal energy from one appliance to another.

With reference now to FIG. 6 an illustrative view of an appliance system 10 is shown wherein the thermal energy generator 32 is a water heater thermally coupled to an appliance group via conduits 34. The appliance group includes a washer and dryer appliances 12, 14. The appliance system 10 includes a sensor 40 (no 40 in the FIG. 6?) in communication with the appliance group. The sensor 40 is operable to detect the amount of thermal energy within the washer 12 and dryer 14. Alternatively, the appliance system 10 may include a first sensor 40*a* and a second sensor 40*b*. The first sensor 40*a* is operable to detect the amount of thermal energy generated by the washer appliance 12 and the second sensor 40*b* is operable to detect the amount of thermal energy generated by the dryer appliance 14.

The appliance system 10 includes one or more processors 42 in communication with the sensors 40*a* and/or 40*b*. The water heater 32 utilizes water from a utility source 44 to store water for use in the appliances 12, 14. Currently, water heaters replenish water used by each appliance with relatively cold water from the utility source. This water is then heated so as to maintain a source of water at a selected temperature. In the present invention, thermal energy bearing water from the appliances is recycled back into the water heater so as to minimize the amount of relatively cold water used to replenish the water heater, thereby saving energy.

The water heater 32 is operably connected to the first appliance and the second appliance via the conduits 34 and includes a first inlet 46, a second inlet 48, and an outlet 50. The first inlet 46 is in fluid communication with the utility water supply 44. The second inlet 48 and the outlet 50 are in fluid communication with the conduits 34 so as to supply heated water 32 to the appliance group, and receive grey water bearing thermal energy from the appliances 12, 14 in the appliance group.

The appliance system 10 and/or the water heater 32 may further include a pump 52 operable to deliver thermal energy bearing fluids from the appliance group to the water heater. Preferably, the pump is disposed downstream the water heater 32. The appliance system 10 may further include a filter 54 operable to filter thermal energy bearing fluids, such as grey water, delivered from the appliance group to the water heater 32.

The water heater 32 is in communication with a processor 42. In addition, the processor 42 processes the thermal energy detected in the first and second appliance 12, 14 so as to direct the water heater 32 to deliver thermal energy to the first and second appliances 12, 14 simultaneously or at different times via one or more of the thermal energy bearing fluids and thereby reduce the power consumption for operating the appliance group. Further, thermal bearing fluids may be recycled back into the water heater 32 through one of the conduits 34 in fluid communication with the second inlet 48 so as to reduce the need for introduction of cold water from the utility water supply. Thus, less energy is required to maintain the water heater 32 at a selected temperature.

The appliance system 10 may further include a database 56 operable to store a plurality of cycle parameters corresponding to washer 12 and dryer 14. In some instances, the database 56 is in wireless communication with the appliance 10, however this is not required. The input 38 is operable to select at least one of the cycle parameters. It should be appreciated by those skilled in the art, that a combination of cycle parameters may be selected. For instance a washer 12 may be operable to run a light wash utilizing cold water. Likewise, the dryer 14 may have cycle parameters such as air dry, or heat dry, wherein in an air dry cycle parameter ambient air is used to dry the clothes and in a heat dry cycle parameter heated air is used to dry clothes. It is appreciated that each of the plurality of cycle parameters can further include the thermal needs of the selected cycle of parameters and the input 38 can be in communication with each of the at least two appliances 12, 14, so as to actuate the respective one of the at least two appliances 12, 14 in the selected cycle parameters.

The processor 42 is operable to process the selected cycle parameters so as to actuate the water heater 32 to deliver thermal energy to each of the at least two appliances 12, 14 in accordance with the thermal energy needs of the selected cycle parameters. The processor 42 may be in electrical communication with a controller 58 operable to control the input and output of thermal bearing fluids from respective washer and dryer appliances 12, 14. The controller 58 may include mechanical devices such as valves and pumps coupled to conduits interconnecting the water heater to the respective washer and dryer appliances 12, 14.

The processor 42 may calculate the thermal energy generated by the appliances 12, 14 along with the thermal energy needs of the selected cycle parameter to direct energy between the water heater 32 and the appliances 12, 14. In addition, the processor 42 is operable to process the selected cycle parameters so as to actuate the water heater 32 to deliver thermal energy to each of the at least two appliances 12, 14. In one instance, thermal energy from one of the two appliances 12, 14 is delivered to the other of the two appliances 12, 14 when the thermal energy generated from one of the two appliances 12, 14 exceeds the thermal energy needs of the selected cycle parameter of the other of the two appliances 12, 14. This may be beneficial when the thermal energy detected in the other of the two appliances 12, 14 does not meet the thermal energy needs of the selected cycle parameter.

For example, in cases where the dryer 14 is configured to inject steam into the drying chamber, thermal energy bearing fluids from the washer 12 may be delivered to the dryer 14 during the washer's operation. Such dryers 14 include a liquid-to-air converter 60 operable to heat water to steam so as to inject steam into the drying chamber. In such a case, water drained from the washer 12, also referenced as "grey water" may be heated, and the heated grey water may be introduced into a liquid-to-air converter 60 for conversion into steam. In addition to or alternatively, the thermal energy bearing grey water may be passed by a thermal storage unit 36 to transfer energy thereto, the thermal storage unit 36 being coupled to a conduit 34 supplying water to the liquid-to-air converter 60.

Specifically, a first air conduit 34*a* can deliver air from the environment to an air heater for introduction into the dryer 14 and the liquid-to-air converter 60 is operable to selectively inject steam into the dryer 14 during drying operations. In addition, the liquid-to-air converter 60 is in fluid communication with the first inlet 46 and may or may not be adjacent the first air conduit 34*a* so as to transfer thermal energy to the first air conduit 34*a*. The thermal storage unit 36 can also be in fluid communication with the first air conduit 34*a* and thereby transfer thermal energy thereto.

The system may further include a second air conduit 34*b* that interconnects the washer 12 to the first air conduit 34*a*. The second air conduit 34*b* is operable to receive thermal energy bearing fluids from the washer 14 so as to provide heated air to the first air conduit 34*a* and/or to the liquid-to-air converter 60. In this manner, water and/or air can be preheated and thereby reduce the power required to convert water to steam and/or preheat air supplied to the dryer 14.

The appliance system 10 is configured to reduce the operating power load of the appliances by utilizing thermal energy which would otherwise be drained. For example, in some instances the processor 42 may direct thermal bearing fluids from the washer 12 to meet the thermal energy needs of the dryer 14 when: (1) the thermal energy generated by the washer 12 exceeds the thermal energy needs of the selected cycle parameter of the dryer 14; and (2) the thermal energy detected in the dryer 14 does not meet the thermal energy needs of the selected cycle parameter of the dryer 14. In such an operation, thermal bearing "grey water" may be used to warm up air being introduced into the drying chamber when the dryer is operating in an "air dry" mode.

Figure 7:
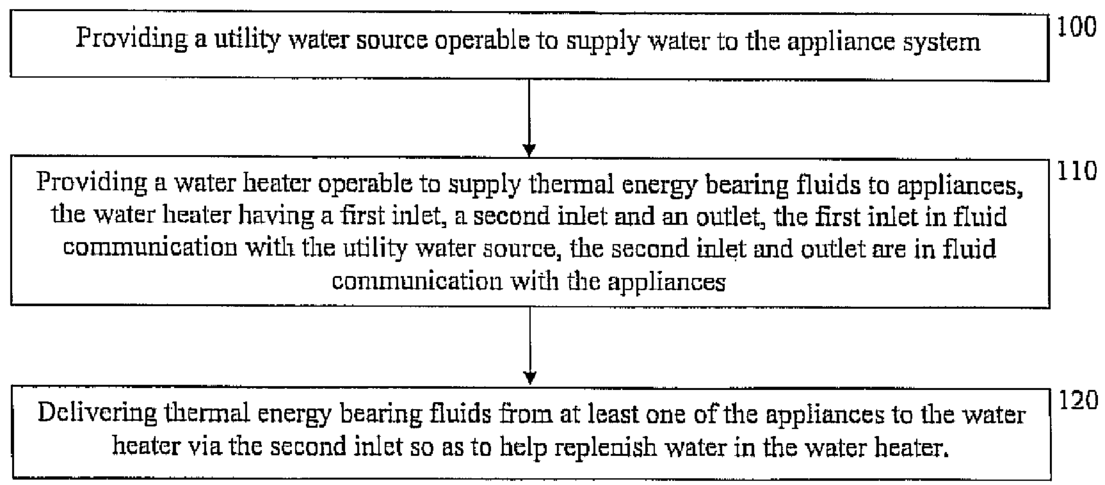
FIG. 7 is a chart showing steps for reducing energy consumption of a water heater.

With reference now to FIG. 7, a method of reducing energy consumption of a water heater is provided. The method begins at step 100 wherein a utility water source is provided. The utility water source is operable to supply water to the appliance system.

At step 110 a water heater is provided. The water heater is operable to supply thermal energy bearing fluids to the appliances. The water heater includes a first inlet, a second inlet and an outlet. The first inlet is coupled to a utility water source, so as to be in fluid communication with a utility water source. As is known, the water heater is operable to heat water to a selected temperature and may include an input operable to adjust the temperature of water in the water heater to a selected degree. The heated water is then delivered to various appliances upon user demand through the outlet.

The second inlet is also in fluid communication with the appliances. It should be appreciated that any appliance currently known and used in the art may be adaptable for use herein, illustratively including a clothes washer, clothes dryer, dishwasher, and the like. The appliances include an input operable to draw hot water from the water heater. It should be appreciated that the water heater replenishes the drawn hot water with relatively cold water from the utility water source. Thus, the water heater must consume additional energy to heat the cold water to the selected water temperature.

The method proceeds to the step 120 wherein thermal energy bearing fluids (hot water) are delivered from at least one of the appliances to the water heater via the second inlet so as to help replenish water in the water heater. The water heater may recover any deficiency in water capacity by drawing water from the utility water source. Accordingly, less cold water is drawn from the utility water source relative to current methods of replenishing water in a water heater. Thus, less energy is required to heat the water heater to a selected temperature.

Figure 8:
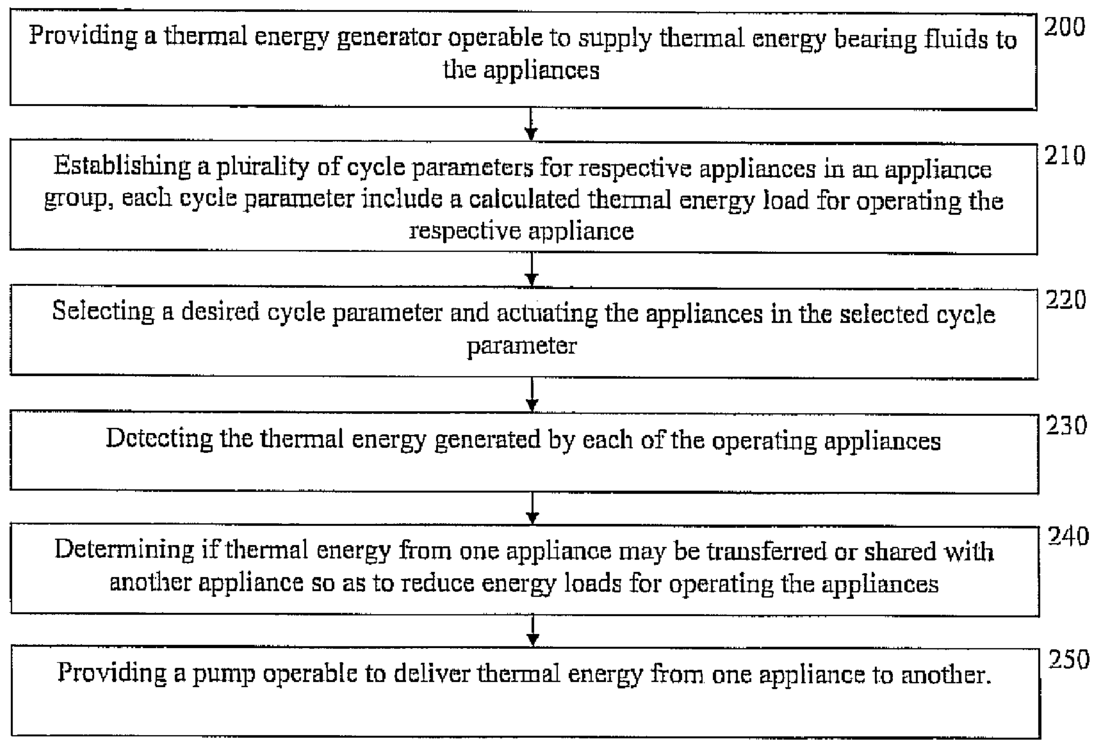
FIG. 8 is a chart showing steps reducing energy consumption of an appliance system.

With reference now to FIG. 8, a method of reducing energy consumption of an appliance system is provided. The appliance system includes a group of appliances having at least two appliances. At step 200 a thermal energy generator, such as a water heater is provided. The thermal energy water heater is operable to supply thermal energy bearing fluids to the appliances in the appliance system.

At step 210 a plurality of cycle parameters for respective appliances in the appliance group are established. Each of the cycle parameters include a calculated thermal energy load for operating the respective appliance. For example and for illustrative purposes only, a cycle parameter for operating the washer with a heavy load using hot water may have a calculated thermal load of 50 BTUs, whereas a cycle parameter for operating the washer with a light load using cold water may have a calculated thermal load of 5 BTUs. At step 220, the user selects a desired cycle parameter and the appliances are actuated according to the selected cycle parameter.

At step 230, the method proceeds to sensing the thermal energy of each of the operating appliances, for example, a sensor detects the thermal energy generated by each of the appliances. At step 240, the method proceeds to determining if thermal energy from one appliance may be transferred or shared with another appliance so as to reduce energy loads for operating the appliances. A controller may be provided, the controller operable to deliver thermal bearing fluids from an appliance having excess thermal energy bearing fluids to heat an appliance in need to thermal energy bearing fluids so as to reduce energy consumption of the appliance system.

At step 250, a pump operatively connected to the second inlet is provided. The pump is operable to deliver thermal bearing fluids from the appliances to the water heater. The method may further include the step of providing a filter, the filter operable to filter the thermal bearing fluids. The filter may be mounted to the second inlet and upstream the water heater. Thus, thermal bearing fluids are filtered prior to entering the water heater.

It is to be understood that variations and modifications can be made on the aforementioned structure without departing from the concepts of the present invention, and further it is to be understood that such concepts are intended to be covered by the following claims unless these claims by their language expressly state otherwise.

The invention claimed is:

1. An appliance system comprising:

an appliance group that includes at least two appliances including:

a first appliance designed to perform a first consumer function related to the first appliance;

a first sensor to detect a first amount of thermal energy within the first appliance;

a second appliance separate from the first appliance and designed to perform a second consumer function related to the second appliance; and a second sensor to detect a second amount of thermal energy within the second appliance;

a thermal energy generator in communication with a processor that heats at least one thermal energy bearing fluid, and is operatively connected to the first appliance and the second appliance; and the processor in communication with the first and second sensors and programmed to process the first and second amounts of thermal energies and, direct the thermal energy generator to deliver thermal energy to the one of the first appliance and second appliance having the smallest respective thermal energy to reduce the power consumption for operating the appliance group.

2. The appliance system as set forth in claim 1, further comprising a plurality of cycle parameters and an input for each of the at least two appliances in the appliance group, and a database, each of the plurality of cycle parameters having the thermal needs of the respective one of the at least two appliances and the input operable to select one of the plurality of cycle parameters so as to actuate the respective one of the at least two appliances in the selected cycle parameters.

3. The appliance system as set forth in claim 2, wherein the processor is operable to process the selected cycle parameters so as to actuate the thermal energy generator to deliver thermal energy to each of the at least two appliances, wherein the processor is also operable to deliver thermal energy from the first appliance to the second appliance when the thermal energy generated from the first appliance exceeds the thermal energy needs of the selected cycle parameter for the first appliance and the thermal energy detected in the second appliance does not meet the thermal energy needs of the selected cycle parameter for the second appliance.

4. The appliance system as set forth in claim 1, wherein the sensor is a first sensor and a second sensor, the first sensor in communication with and operable to detect the amount of thermal energy generated by the first appliance, the second sensor in communication with and operable to detect the amount of thermal energy generated by the second appliance.

5. The appliance system as set forth in claim 1, wherein the thermal energy generator is a water heater.

6. The appliance system as set forth in claim 5, wherein the water heater includes a first inlet, a second inlet, and an outlet, the first inlet in fluid communication with a utility water supply, the second inlet and outlet in fluid communication with the appliance group.

7. The appliance system as set forth in claim 6, further comprising a pump operable to deliver a thermal energy bearing fluid from the appliance group to the water heater.

8. The appliance system as set forth in claim 6, further comprising a filter operable to filter a thermal energy bearing fluid delivered from the appliance group to the water heater.

9. The appliance system as set forth in claim 6, wherein the first appliance comprises a washer and the second appliance comprises a dryer including a liquid to air converter, an air heater, and a first air conduit delivering air from the environment to the air heater for introduction into the dryer, the liquid to air converter operable to selectively inject steam into the dryer during drying operations, the liquid to air converter in fluid communication with the first inlet and adjacent the first air conduit so as to transfer thermal energy to the first air conduit.

10. The appliance system as set forth in claim 9, further comprising a second air conduit, the second air conduit interconnecting the washer to the first air conduit, the second air conduit operable to receive thermal energy from the washer so as to provided heated air to the first air conduit.

11. The appliance system as set forth in claim 1, wherein the processor is further programmed to direct the thermal energy generator to deliver the thermal energy to both of the first appliance and second appliance when their respective thermal energies are similar.

12. The appliance system as set forth in claim 1, wherein each of the first and second appliances have a respective valve, and wherein the processor is further programmed to direct the thermal energy generator to deliver the thermal energy to the one of the first appliance and second appliance by controlling the valves.

* * * * *